US012695546B2

(12) United States Patent
Yin et al.

(10) Patent No.: US 12,695,546 B2
(45) Date of Patent: Jul. 28, 2026

(54) DATA TRANSMISSION METHOD AND DEVICE AND STORAGE MEDIUM

(71) Applicant: HUIZHOU TCL MOBILE COMMUNICATION CO., LTD, Huizhou (CN)

(72) Inventors: Xiaoxue Yin, Huizhou (CN); Jia Sheng, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 403 days.

(21) Appl. No.: 17/904,107

(22) PCT Filed: Mar. 26, 2020

(86) PCT No.: PCT/CN2020/081347
§ 371 (c)(1),
(2) Date: Aug. 12, 2022

(87) PCT Pub. No.: WO2021/159593
PCT Pub. Date: Aug. 19, 2021

(65) Prior Publication Data
US 2023/0072619 A1 Mar. 9, 2023

(30) Foreign Application Priority Data
Feb. 14, 2020 (CN) .......................... 202010092703.7

(51) Int. Cl.
*H04L 1/18* (2023.01)
*H04L 1/00* (2006.01)
(Continued)

(52) U.S. Cl.
CPC .......... *H04L 1/1812* (2013.01); *H04L 1/0023* (2013.01); *H04W 28/04* (2013.01)

(58) Field of Classification Search
CPC ....... H04L 1/1812; H04L 1/0023; H04L 1/08; H04L 1/1825; H04L 1/1887; H04W 28/04; H04W 4/40
See application file for complete search history.

(56) References Cited

U.S. PATENT DOCUMENTS 8,374,112 B2 2/2013 Jung et al.
11,082,954 B2 * 8/2021 Huang .................. H04L 1/1819
(Continued)

FOREIGN PATENT DOCUMENTS

CN 104640057 A 5/2015
CN 105451211 A 3/2016
(Continued)

OTHER PUBLICATIONS

Huang et al. U.S. Appl. No. 62/942,915, filed Dec. 3, 2019 (Year: 2019).*
(Continued)

*Primary Examiner* — Wutchung Chu
(74) *Attorney, Agent, or Firm* — PV IP PC; Wei Te Chung

(57) ABSTRACT

A data transmission method and device and a storage medium are provided. The method comprises: in a process of triggering a blind retransmission mechanism, obtaining retransmission times circularly (101); and when the retransmission times are less than a preset retransmission times threshold, retransmitting data to a receiving terminal and updating the retransmission times (102).

16 Claims, 4 Drawing Sheets

(51) Int. Cl.
H04L 1/1812 (2023.01)
H04W 28/04 (2009.01)

(56) References Cited

U.S. PATENT DOCUMENTS

| | | | | |
|---|---|---|---|---|
| 11,469,861 | B2 * | 10/2022 | Jung | H04L 1/1887 |
| 11,765,690 | B2 * | 9/2023 | Huang | H04B 7/0456 |
| | | | | 370/329 |
| 12,184,416 | B2 * | 12/2024 | Seo | H04L 1/08 |
| 2020/0235848 | A1 * | 7/2020 | Nguyen | H04L 1/0038 |
| 2021/0168762 | A1 * | 6/2021 | Huang | H04B 7/0456 |
| 2021/0168790 | A1 * | 6/2021 | Li | H04W 72/23 |
| 2021/0306111 | A1 * | 9/2021 | Jung | H04L 1/1671 |
| 2021/0314821 | A1 * | 10/2021 | Huang | H04L 12/2869 |
| 2022/0103287 | A1 * | 3/2022 | Son | H04W 72/20 |
| 2022/0224457 | A1 * | 7/2022 | Ebrahim Rezagah | |
| | | | | H04W 72/20 |
| 2022/0346118 | A1 * | 10/2022 | Wu | H04L 1/1819 |
| 2022/0376827 | A1 * | 11/2022 | Seo | H04L 1/08 |
| 2022/0394678 | A1 * | 12/2022 | Zhang | H04W 72/02 |
| 2024/0243839 | A1 * | 7/2024 | Bagheri | H04L 1/0038 |
| 2025/0141604 | A1 * | 5/2025 | Yang | H04W 72/23 |

FOREIGN PATENT DOCUMENTS

| | | | | | |
|---|---|---|---|---|---|
| CN | 105681002 | A * | 6/2016 | | H04L 1/1864 |
| CN | 107197528 | A | 9/2017 | | |
| CN | 107359971 | A * | 11/2017 | | H04L 1/1887 |
| CN | 107710721 | A | 2/2018 | | |
| CN | 108023688 | A | 5/2018 | | |
| CN | 109617659 | A | 4/2019 | | |
| CN | 109952779 | A | 6/2019 | | |
| CN | 110169094 | A | 8/2019 | | |
| CN | 110351684 | A | 10/2019 | | |
| WO | 2018064179 | A1 | 4/2018 | | |
| WO | WO-2021010742 | A1 * | 1/2021 | | H04L 5/0053 |

OTHER PUBLICATIONS

Son et al. U.S. Appl. No. 62/935,276, filed Nov. 14, 2019 (Year: 2019).*

International Search Report in International application No. PCT/CN2020/081347, mailed on Nov. 18, 2020.

Written Opinion of the International Search Authority in international application No. PCT/CN2020/081347, mailed on Nov. 18, 2020.

Chinese Office Action issued in corresponding Chinese Patent Application No. 202010092703.7 dated Nov. 18, 2020. pp. 1-6.

Notification to Grant Patent Right for Invention issued in corresponding Chinese Patent Application No. 202010092703.7 dated Apr. 19, 2021. pp. 1-4.

* cited by examiner

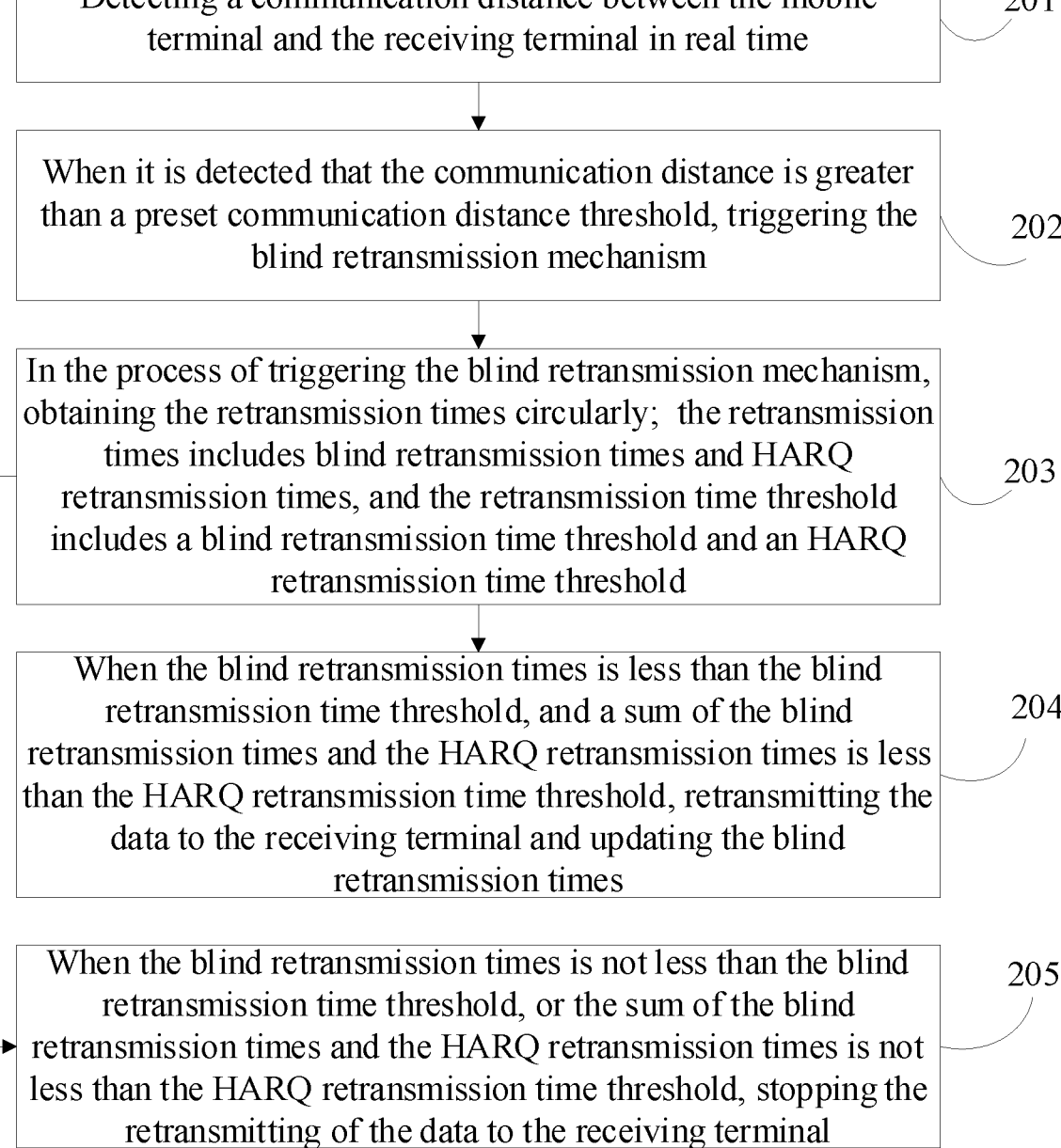

Detecting a communication distance between the mobile terminal and the receiving terminal in real time — 201

When it is detected that the communication distance is greater than a preset communication distance threshold, triggering the blind retransmission mechanism — 202

In the process of triggering the blind retransmission mechanism, obtaining the retransmission times circularly; the retransmission times includes blind retransmission times and HARQ retransmission times, and the retransmission time threshold includes a blind retransmission time threshold and an HARQ retransmission time threshold — 203

When the blind retransmission times is less than the blind retransmission time threshold, and a sum of the blind retransmission times and the HARQ retransmission times is less than the HARQ retransmission time threshold, retransmitting the data to the receiving terminal and updating the blind retransmission times — 204

When the blind retransmission times is not less than the blind retransmission time threshold, or the sum of the blind retransmission times and the HARQ retransmission times is not less than the HARQ retransmission time threshold, stopping the retransmitting of the data to the receiving terminal — 205

FIG. 3

DATA TRANSMISSION METHOD AND DEVICE AND STORAGE MEDIUM

CROSS-REFERENCE TO RELATED APPLICATIONS

This application is a US national phase application based upon an International Application No. PCT/CN2020/081347, filed on Mar. 26, 2020, which claims priority to Chinese Patent Application No. 202010092703.7 filed on Feb. 14, 2020, titled "DATA TRANSMISSION METHOD AND DEVICE AND STORAGE MEDIUM", which is incorporated by reference in its entirety in the present application.

TECHNICAL FIELD

The present application relates to the field of communication technology, in particular to a data transmission method, a device, and a storage medium.

BACKGROUND

A vehicle to everything (V2X) technology is a new generation of information and communication technology that connects a vehicle with everything, wherein V represents a vehicle and X represents any object that interacts with the vehicle. Currently, X mainly includes vehicles, people, roadside infrastructure, and networks. An information mode of a V2X interaction includes: a vehicle to vehicle (V2V) interaction, a vehicle to infrastructure (V2I) interaction, a vehicle to pedestrian (V2P) interaction, and a vehicle to network (V2N) interaction. In order to satisfy the interaction between the vehicle and various objects, especially a direct communication between two user equipment (UE), a sidelink mode is introduced.

In sidelink, to ensure QoS performance, a transmitting terminal will trigger a blind retransmission mechanism under certain circumstances to ensure communication quality of some receiving terminals and improve communication reliability. However, an existing technology does not limit blind retransmission, resulting in excessive blind retransmission and increased signaling overhead.

SUMMARY

Technical Problems

Embodiment(s) of the present application provides a data transmission method, a device, and a storage medium, which may improve communication reliability while ensuring signaling overhead.

Technical Solutions

In a first aspect, an embodiment of the present application provides a data transmission method applied to a mobile terminal, and the method includes:

in a process of triggering a blind retransmission mechanism, obtaining retransmission times circularly; and when the retransmission times are less than a preset retransmission time threshold, retransmitting data to a receiving terminal and updating the retransmission times.

In some embodiments of the present application, the method also includes:

detecting a communication distance between the mobile terminal and the receiving terminal in real time; and when it is detected that the communication distance is greater than a preset communication distance threshold, triggering the blind retransmission mechanism.

In some embodiments of the present application, the retransmission times include blind retransmission times and HARQ retransmission times, and the retransmission time threshold includes a blind retransmission time threshold and an HARQ retransmission time threshold; and when the retransmission times are less than the preset retransmission time threshold, retransmitting the data to the receiving terminal and updating the retransmission times specifically comprises:

when the blind retransmission times are less than the blind retransmission time threshold, and a sum of the blind retransmission times and the HARQ retransmission times is less than the HARQ retransmission time threshold, retransmitting the data to the receiving terminal and updating the blind retransmission times.

In some embodiments of the present application, the method also includes:

when the blind retransmission times are not less than the blind retransmission time threshold, or the sum of the blind retransmission times and the HARQ retransmission times is not less than the HARQ retransmission time threshold, stopping the retransmitting of the data to the receiving terminal In some embodiments of the present application, an initial value of the blind retransmission times is 0; and updating the blind retransmission times specifically comprises:

increasing the blind retransmission times by 1.

In a second aspect, an embodiment of the present application further provides a data transmission device applied to a mobile terminal, and the device includes:

an acquisition module configured to in a process of triggering a blind retransmission mechanism, obtain retransmission times circularly; and a retransmission module configured to when the retransmission times are less than a preset retransmission time threshold, retransmit data to a receiving terminal and update the retransmission times.

In some embodiments of the present application, the device further includes:

a triggering module configured to detect a communication distance between the mobile terminal and the receiving terminal in real time; and when it is detected that the communication distance is greater than a preset communication distance threshold, trigger the blind retransmission mechanism.

In some embodiments of the present application, the retransmission times include blind retransmission times and HARQ retransmission times, and the retransmission time threshold includes a blind retransmission time threshold and an HARQ retransmission time threshold; and the retransmission module is further configured to when the blind retransmission times are less than the blind retransmission time threshold, and a sum of the blind retransmission times and the HARQ retransmission times is less than the HARQ retransmission time threshold, retransmit the data to the receiving terminal and update the blind retransmission times.

In some embodiments of the present application, the device further includes:

a stopping module configured to when the blind retransmission times are not less than the blind retransmission time threshold, or the sum of the blind retransmission times and the HARQ retransmission times is not less than the HARQ retransmission time threshold, stopping the retransmitting of the data to the receiving terminal In some embodiments of the present application, an initial value of the blind retransmission times is 0; and the retransmission module is further configured to increase the blind retransmission times by 1.

In a third aspect, an embodiment of the present application further provides computer-readable storage medium storing a plurality of instructions, and the instructions are suitable to be loaded by a processor to perform following operations:

in a process of triggering a blind retransmission mechanism, obtaining retransmission times circularly; and when the retransmission times are less than a preset retransmission time threshold, retransmitting data to a receiving terminal and updating the retransmission times.

In some embodiments of the present application, the instructions are suitable to be loaded by the processor to further perform following operations:

detecting a communication distance between a mobile terminal and the receiving terminal in real time; and when it is detected that the communication distance is greater than a preset communication distance threshold, triggering the blind retransmission mechanism.

In some embodiments of the present application, the retransmission times include blind retransmission times and HARQ retransmission times, and the retransmission time threshold includes a blind retransmission time threshold and an HARQ retransmission time threshold; and when the retransmission times are less than the preset retransmission time threshold, retransmitting the data to the receiving terminal and updating the retransmission times, specifically comprises:

when the blind retransmission times are less than the blind retransmission time threshold, and a sum of the blind retransmission times and the HARQ retransmission times is less than the HARQ retransmission time threshold, retransmitting the data to the receiving terminal and updating the blind retransmission times.

In some embodiments of the present application, the instructions are suitable to be loaded by the processor to further perform the following operations:

when the blind retransmission times are not less than the blind retransmission time threshold, or the sum of the blind retransmission times and the HARQ retransmission times is not less than the HARQ retransmission time threshold, stopping the retransmitting of the data to the receiving terminal In some embodiments of the present application, an initial value of the blind retransmission times is 0; and updating the blind retransmission times specifically comprises:

increasing the blind retransmission times by 1.

Advantageous Effects

The data transmission method, the device, and the storage medium provided by the present application may obtain retransmission times circularly when a blind retransmission mechanism is triggered, to retransmit data to a receiving terminal and update the retransmission times when the retransmission times are less than a preset retransmission time threshold, so as to limit the retransmission times of the data, which may improve communication reliability while ensuring signaling overhead, and maintain a balance between the signaling overhead and the communication reliability.

BRIEF DESCRIPTION OF DRAWINGS

The technical solutions and other beneficial effects of the present application will be apparent through the detailed description of the specific implementation of the present application in combination with the accompanying drawings.

FIG. 3 is another flow diagram of the data transmission method provided by an embodiment of the present application.

EMBODIMENTS OF PRESENT INVENTION

The technical solutions in the embodiments of the present application will be clearly and completely described below in combination with the accompanying drawings in the embodiments of the present application. Obviously, the described embodiments are only part of the embodiments of the present application, not all of them. Based on the embodiments in the present application, all other embodiments obtained by those skilled in the art without making creative work fall within the scope of protection of the present application.

Figure 1:
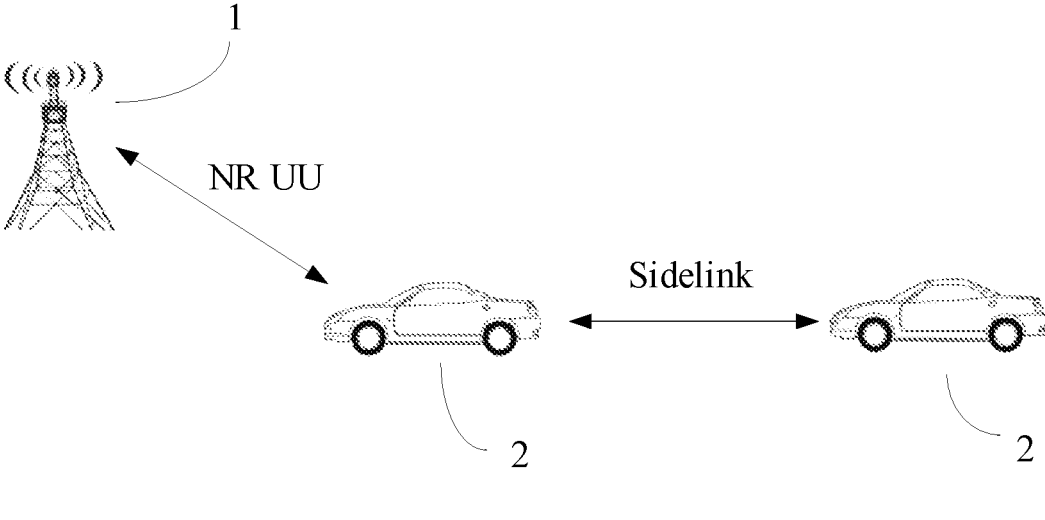
FIG. 1 is a structural diagram of a V2X system provided by an embodiment of the present application.

As shown in FIG. 1, FIG. 1 is a structural diagram of a V2X system. The V2X system includes a base station 1 and a terminal 2. The base station 1 may include various forms of macro base stations, micro base stations, relay stations, access points, etc. The terminal 2 may be electronic devices such as various handheld devices, on-board devices, wearable devices, etc. which have an infinite communication function. The terminal 2 may be applied to vehicles, infrastructure, etc. The base station 1 and the terminal 2 may be connected through an air interface technology (such as NR Uu), and the terminal 2 and another terminal 2 may be connected through a sidelink. A communication mode of the sidelink realizes addressing through a source identification and a target identification of media access control (MAC). There is no need to connect the terminals 2 in advance before transmission.

V2X usage cases may be roughly divided into the following four types:

(1) Vehicles platooning enables vehicles to dynamically form a platoon and travel together. All vehicles in the platoon obtain information from a leading vehicle to manage the platoon. The information allows the vehicles to travel closer than normal in a coordinating manner, and to drive together toward a same direction.

(2) Extended sensors enable an exchange of raw or processed data gathered through local sensors or live video images among the vehicles, road side units (RSUs), devices of pedestrians, and V2X application servers. These vehicles may increase perception of an environment beyond a range that their own sensors may detect, thus providing a broader and more holistic view of a local situation. A high data rate is one of key characteristics of the extended sensors.

(3) Advanced driving enables semi-automatic or full-automatic driving. Each vehicle and/or the roadside unit (RSU) shares perception data obtained from its local sensors with vehicles in proximity, allowing the vehicles to synchronize and coordinate driving trajectories of the vehicles. Each vehicle shares its driving information with its nearby vehicles.

(4) Remote driving enables a remote driver or a V2X application to operate a remote vehicle for passengers who cannot drive by themselves or are in a dangerous environment. For a case where variation is limited and routes are predictable, such as public transportation, driving based on cloud computing may be used. High reliability and low latency are main requirements for the remote driving.

The sidelink introduces a concept of groupcast, which is mainly aimed at the use case of the above vehicles platooning. In the groupcast, a physical layer supports functions of hybrid automatic repeat request (HARQ) feedback and hybrid automatic repeat merge. When a sidelink HARQ feedback is enabled for the groupcast, it is supported to use a TX-RX (transmitting terminal-receiving terminal) distance and/or a reference signal receiving power (RSRP) to decide whether to send the HARQ feedback. The HARQ feedback of the groupcast supports two options:

Option 1: if the receiving terminal fails to decode a corresponding transport block (TB) after decoding a relevant physical sidelink control channel (PSCCH), HARQ-NACK (non-acknowledgement, decoding failure) is transmitted on a physical sidelink feedback channel (PSFCH). Otherwise, there will be no signals to be transmitted on the PSFCH.

Option 2: if the receiving terminal successfully decodes the corresponding TB, HARQ-ACK (acknowledgement, decoding success) will be transmitted on the PSFCH. After decoding the relevant PSCCH targeted at the receiving terminal, if the corresponding TB cannot be successfully decoded, the HARQ-NACK will be transmitted on the PSFCH.

Figure 2:
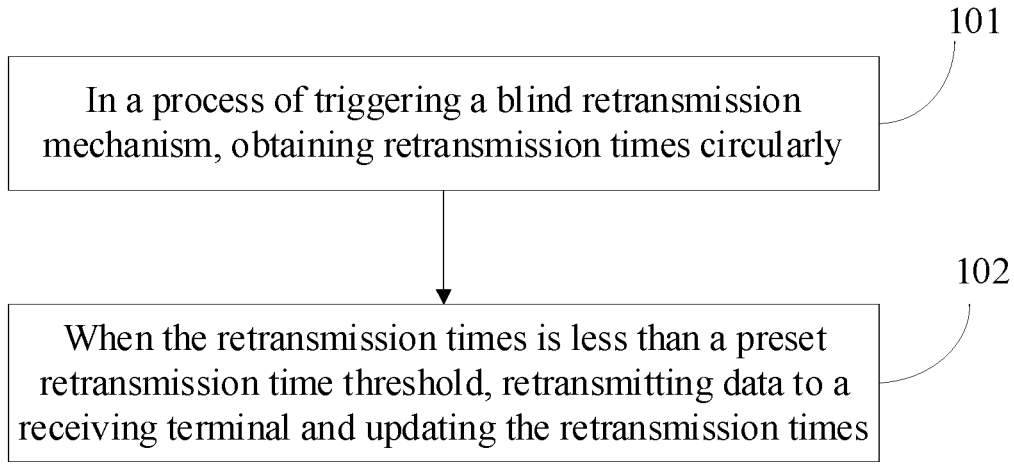
FIG. 2 is a flow diagram of a data transmission method provided by an embodiment of the present application.

As shown in FIG. 2, FIG. 2 is a flow diagram of a data transmission method provided by an embodiment of the present application. The data transmission method is applied to a mobile terminal, which may be the terminal 2 in FIG. 1. A specific process of the data transmission method may be as follows:

101, in a process of triggering a blind retransmission mechanism, retransmission times are obtained circularly.

In an embodiment of the present application, the mobile terminal may be a transmitting terminal. The blind retransmission mechanism may be triggered by a communication distance between the mobile terminal and a receiving terminal. The receiving terminal may be the terminal 2 in FIG. 1.

Specifically, the method also includes:

detecting the communication distance between the mobile terminal and the receiving terminal in real time; and when it is detected that the communication distance is greater than a preset communication distance threshold, triggering the blind retransmission mechanism.

It should be noted that the preset communication distance threshold is a value of communication range requirement. The communication range requirement may be obtained by decoding sidelink control information (SCI).

The communication distance between the mobile terminal and the receiving terminal may be calculated by the receiving terminal. Location information of the mobile terminal will be carried through a second stage SCI (2nd stage SCI). If the mobile terminal is in a link state and the mobile terminal may also obtain location information of the receiving terminal, the mobile terminal may also know the communication distance between the mobile terminal and the receiving terminal, and then the mobile terminal may detect whether the communication distance satisfies the communication range requirement; that is, detect which of the communication distance and the preset communication distance threshold is greater.

If the communication distance between the receiving terminal and the mobile terminal is less than or equal to the communication distance threshold, the receiving terminal transmits the HARQ feedback for a physical sidelink shared channel (PSSCH). If the communication distance between the receiving terminal and the mobile terminal is greater than the communication distance threshold, the receiving terminal will not transmit the HARQ feedback for the PSSCH. In such case, if the mobile terminal does not perform any processing, a QoS performance will be affected. Therefore, when the communication distance is greater than the communication distance threshold, the blind retransmission mechanism is triggered.

The blind retransmission refers to data transmission carried out by the transmitting terminal under circumstances that the transmitting terminal does not obtain a feedback from the receiving terminal or the transmitting terminal is in a preset condition. The blind retransmission may ensure communication quality of the receiving terminal and improve communication reliability. However, excessive blind retransmission will increase signaling overhead. In order to achieve a balance between the signaling overhead and the communication reliability, it is necessary to limit the retransmission times. Therefore, before each retransmission, the mobile terminal obtains current cumulative retransmission times and determines whether to continue retransmitting data according to the current cumulative retransmission times.

102, when the retransmission times are less than a preset retransmission time threshold, retransmitting the data to the receiving terminal and updating the retransmission times.

In the embodiment of the present application, in order to ensure the balance between the signaling overhead and the communication reliability, the retransmission time threshold is preset. Before each retransmission, it is detected which of the retransmission times and the retransmission time threshold is greater. If the retransmission times are less than the retransmission time threshold, it is indicated that the mobile terminal still has remaining retransmission times. The mobile terminal retransmits the data to the receiving terminal, and updates the retransmission times during retransmission, so that the mobile terminal may obtain latest retransmission times before a next retransmission. If the retransmission times are not less than the preset retransmission time threshold, the retransmitting of the data to the receiving terminal will be stopped. In addition, the mobile terminal may also obtain current retransmission times when triggering the blind retransmission mechanism, and calculate the remaining retransmission times according to the current retransmission times and the retransmission time threshold, and then retransmit the data to the receiving terminal according to the remaining retransmission times. For example, if the mobile terminal determines that the remaining retransmission times are 2, the mobile terminal retransmits the data to the receiving terminal twice, and the data retransmitted each time is the same.

In a preferred embodiment, the retransmission times are blind retransmission, and the retransmission time threshold is a blind retransmission time threshold. A parameter MaxRetransNum may be set in the mobile terminal to represent the blind retransmission time threshold. The parameter MaxRetransNum is only valid for the blind retransmission, that is, the parameter MaxRetransNum only acts on a blind retransmission process triggered by the mobile terminal. The parameter MaxRetransNum may be obtained through high-level configuration or may be preset. The mobile terminal obtains the blind retransmission time threshold through the parameter MaxRetransNum.

A counter (RetransCnt) may be set in the mobile terminal to calculate the blind retransmission times. A value of the counter in an initial state is 0. Each time the mobile terminal performs the blind retransmission, the value of the counter is increased by 1. The mobile terminal obtains the value of the counter before the blind retransmission, and then obtains the blind retransmission times. If the value of the counter is less than the blind retransmission time threshold, the mobile terminal retransmits the data to the receiving terminal, and increases the value of the counter by 1. If the value of the counter reaches the blind retransmission time threshold, the mobile terminal stops the retransmitting of the data to the receiving terminal, and the counter also stops the counting.

In another preferred embodiment, the retransmission times include the blind retransmission times and HARQ retransmission times, and the retransmission time threshold includes the blind retransmission time threshold and an HARQ retransmission time threshold.

In the step 102, when the retransmission times are less than the preset retransmission time threshold, retransmitting the data to the receiving terminal and updating the retransmission times, specifically includes:

when the blind retransmission times are less than the blind retransmission time threshold, and a sum of the blind retransmission times and the HARQ retransmission times is less than the HARQ retransmission time threshold, retransmitting the data to the receiving terminal and updating the blind retransmission times.

Further, the method also includes:

when the blind retransmission times are not less than the blind retransmission time threshold, or the sum of the blind retransmission times and the HARQ retransmission times is not less than the HARQ retransmission time threshold, stopping the retransmitting of the data to the receiving terminal.

It should be noted that in addition to the blind retransmission, the mobile terminal itself also has HARQ retransmission. For example, when the communication distance between the mobile terminal and the receiving terminal is less than the communication distance threshold, the mobile terminal transmits the data to the receiving terminal; but if the receiving terminal fails to decode, an HARQ retransmission mechanism will be triggered. The present embodiment combines the blind retransmission with the HARQ retransmission, that is, setting the blind retransmission time threshold and the HARQ retransmission time threshold, to limit the blind retransmission by combining the blind retransmission time threshold and the HARQ retransmission time threshold.

In the mobile terminal, the parameter MaxRetransNum may be set to represent the blind retransmission time threshold, and a parameter MaxRetransNum leg may be set to represent the HARQ retransmission time threshold. Thus, the mobile device may obtain the blind retransmission time threshold through the parameter MaxRetransNum, and obtain the HARQ retransmission time threshold through the parameter MaxRetransNum leg. The HARQ retransmission time threshold is greater than the blind retransmission time threshold.

Two of the counters may be set in the mobile terminal, wherein a counter A calculates the blind retransmission times and a counter B calculates the HARQ retransmission times, and both an initial state of the counter A and an initial state of the counter B are 0. When the communication distance between the mobile terminal and the receiving terminal is less than the communication distance threshold, if the mobile terminal triggers the HARQ retransmission mechanism, a value of the counter A will be increased by 1 for each HARQ retransmission. When the communication distance between the mobile terminal and the receiving terminal is greater than the communication distance threshold, the blind retransmission mechanism is triggered, and the counter A stops the counting. At this time, the value of counter A is the HARQ retransmission times, and the counter B starts the counting, and a value of the counter B is increased by 1 for each blind retransmission. If the values of the counter A and the counter B are less than the HARQ retransmission time threshold, and the value of the counter B is less than the blind retransmission time threshold, the mobile terminal retransmits the data to the receiving terminal and increases the value of the counter B by 1. If the value of the counter A is equal to the HARQ retransmission time threshold, or a sum of the values of the counter A and the counter B is equal to the HARQ retransmission time threshold, or the value of the counter B is equal to the blind retransmission time threshold, the mobile terminal stops the retransmitting of the data to the receiving terminal, and the counter B stops the counting.

In addition, the mobile terminal may also obtain the value of the counter A when triggering the blind retransmission mechanism, and then calculate the remaining blind retransmission times according to the value of the counter A, the HARQ retransmission time threshold, and the blind retransmission time threshold. If the value of the counter A is less than the HARQ retransmission time threshold, a difference between the HARQ retransmission time threshold and the value of the counter A is calculated to obtain remaining HARQ retransmission times. If the remaining HARQ retransmission times are less than the blind retransmission time threshold, the mobile terminal retransmits the data to the receiving terminal according to the remaining HARQ retransmission times; that is, the remaining blind retransmission times of the mobile terminal are the remaining HARQ retransmission times. If the remaining HARQ retransmission times are greater than the blind retransmission time threshold, the mobile terminal retransmits the data to the receiving terminal according to the blind retransmission time threshold; that is, the remaining blind retransmission times of the mobile terminal is the blind retransmission time threshold.

For example, the HARQ retransmission time threshold is 8, that is, MaxRetransNum leg=8, and the blind retransmission time threshold is 4, that is, MaxRetransNum=4. When the mobile terminal triggers the blind retransmission mechanism and the value of the counter A is 2, that is, the mobile terminal has performed the HARQ retransmissions twice, the remaining blind retransmission times are 4, that is, the mobile terminal may retransmit the data to the receiving terminal four times.

The HARQ retransmission time threshold is 4, that is, MaxRetransNum leg=4, and the blind retransmission time threshold is 4, that is, MaxRetransNum=4. When the mobile terminal triggers the blind retransmission mechanism and the value of the counter A is 2, that is, the mobile terminal has performed the HARQ retransmissions twice, the remaining blind retransmission times are 2, that is, the mobile terminal may retransmit the data to the receiving terminal twice.

The HARQ retransmission time threshold is 8, that is, MaxRetransNum leg=8, and the blind retransmission time threshold is 4, that is, MaxRetransNum=4. When the mobile terminal triggers the blind retransmission mechanism and the value of the counter A is 5, that is, the mobile terminal has performed HARQ retransmission five times, the remaining blind retransmission times are 3, that is, the mobile terminal may retransmit the data to the receiving terminal three times.

It can be seen from above that the data transmission method provided by the present application may obtain the retransmission times circularly when the blind retransmission mechanism is triggered, and retransmit the data to the receiving terminal and update the retransmission times when the retransmission times are less than the preset retransmission time threshold, so as to limit the retransmission times of the data, which may improve the communication reliability while ensuring the signaling overhead, and maintain the balance between the signaling overhead and the communication reliability.

Refer to FIG. 3, FIG. 3 is another flow diagram of the data transmission method provided by an embodiment of the present application. The data transmission method is applied to a mobile terminal, and a specific process of the data transmission method may be as follows:

201, a communication distance between the mobile terminal and a receiving terminal is detected in real time.

For example, the mobile terminal C is a transmitting terminal. The mobile terminal C obtains location information of the receiving terminal in real time, and calculates that a current communication distance between the mobile terminal C and the receiving terminal D is 90 meters.

202, when it is detected that the communication distance is greater than a preset communication distance threshold, a blind retransmission mechanism is triggered.

For example, the mobile terminal C acquires the preset communication distance threshold of 80 meters. The communication distance (90 meters) between the mobile terminal C and the receiving terminal D at present is greater than the communication distance threshold (80 meters), and the mobile terminal C triggers the blind retransmission mechanism.

203, in a process of triggering the blind retransmission mechanism, retransmission times are obtained circularly. The retransmission times include blind retransmission times and HARQ retransmission times, and a retransmission time threshold includes a blind retransmission time threshold and an HARQ retransmission time threshold.

For example, when the blind retransmission mechanism is triggered, the blind retransmission times obtained by the mobile terminal C for a first time are 0, and the HARQ retransmission times obtained by the mobile terminal C for the first time are 3. At the same time, the blind retransmission time threshold obtained by the mobile terminal C is 5, and the HARQ retransmission time threshold obtained by the mobile terminal C is 7.

204, when the blind retransmission times are less than the blind retransmission time threshold, and a sum of the blind retransmission times and the HARQ retransmission times is less than the HARQ retransmission time threshold, the data is retransmitted to the receiving terminal and the blind retransmission times are updated.

For example, if the mobile terminal C detects that the blind retransmission times 0 are less than the blind retransmission time threshold 5, and the sum of the blind retransmission times and the HARQ retransmission times is calculated to be 5, which is less than the HARQ retransmission time threshold 7, the mobile terminal C retransmits the data to the receiving terminal D and updates the blind retransmission times to 1.

The blind retransmission times obtained by the mobile terminal C for a second time are 1, and the HARQ retransmission times obtained by the mobile terminal C for the second time are 3. Similarly, the mobile terminal C detects that the blind retransmission times 1 are less than the blind retransmission time threshold 5, and the sum of the blind retransmission times and the HARQ retransmission times is calculated to be 6, which is less than the HARQ retransmission time threshold 7, the mobile terminal C retransmits the data to the receiving terminal D and updates the blind retransmission times to 2.

205, when the blind retransmission times are not less than the blind retransmission time threshold, or the sum of the blind retransmission times and the HARQ retransmission times is not less than the HARQ retransmission time threshold, the retransmitting of the data to the receiving terminal is stopped.

For example, the blind retransmission times obtained by mobile terminal C for a third time are 2, and the HARQ retransmission times obtained by mobile terminal C for the third time are 3. At this time, the mobile terminal C detects that the blind retransmission times 2 are less than the blind retransmission time threshold 5, while the sum of the blind retransmission times and the HARQ retransmission times is calculated to be 7, which is equal to the HARQ retransmission time threshold 7, the mobile terminal C stops the retransmitting of the data to the receiving terminal D.

The embodiment of the present application combines the blind retransmission time threshold and the HARQ retransmission time threshold to limit the blind retransmission times of the mobile terminal C, which improves the communication quality of the receiving terminal D and improves the communication reliability while ensuring the signaling overhead.

According to the method described in the above embodiment, the present embodiment will be further described from a perspective of a data transmission device, which may be integrated into the mobile terminal.

Figure 4:
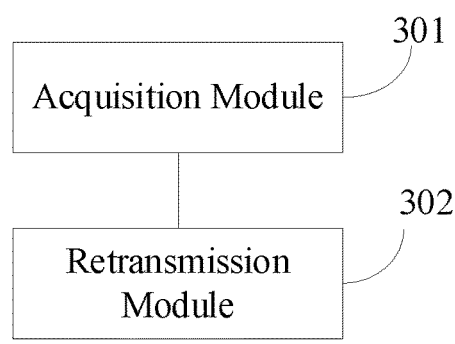
FIG. 4 is a structural diagram of a data transmission device provided by an embodiment of the present application.

Please refer to FIG. 4, FIG. 4 specifically describes a data transmission device provided by an embodiment of the present application. The data transmission device may include: an acquisition module 301 and a retransmission module 302.

(1) the Acquisition Module 301

The acquisition module 301 is configured to obtain retransmission times circularly in a process of triggering a blind retransmission mechanism.

(2) the Retransmission Module 302

The retransmission module 302 is configured to retransmit data to a receiving terminal and update the retransmission times when the retransmission times are less than a preset retransmission time threshold.

Figure 5:
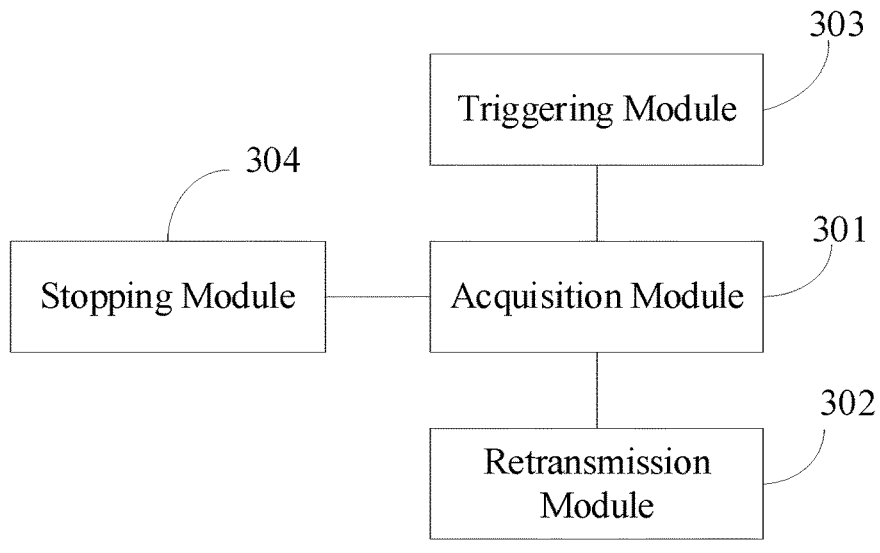
FIG. 5 is another structural diagram of the data transmission device provided by an embodiment of the present application.

In some embodiments of the present application, as shown in FIG. 5, the device also includes:

a triggering module 303 configured to detect a communication distance between the mobile terminal and the receiving terminal in real time, and trigger the blind retransmission mechanism when it is detected that the communication distance is greater than a preset communication distance threshold.

In some embodiments of the present application, the retransmission times include blind retransmission times and HARQ retransmission times, and the retransmission time threshold includes a blind retransmission time threshold and an HARQ retransmission time threshold.

The retransmission module 302 is further configured to retransmit the data to the receiving terminal and update the blind retransmission times when the blind retransmission times are less than the blind retransmission time threshold, and a sum of the blind retransmission times and the HARQ retransmission times is less than the HARQ retransmission time threshold.

In some embodiments of the present application, as shown in FIG. 5, the device also includes:

a stopping module 304 configured to stop the retransmitting of the data to the receiving terminal when the blind retransmission times are not less than the blind retransmission time threshold, or the sum of the blind retransmission times and the HARQ retransmission times is not less than the HARQ retransmission time threshold.

It can be seen from above that the data transmission device provided by the present application may obtain the retransmission times circularly when the blind retransmission mechanism is triggered, and retransmit the data to the receiving terminal and update the retransmission times when the retransmission times are less than the preset retransmission time threshold, so as to limit the retransmission times of the data, which may improve the communication reliability while ensuring the signaling overhead, and maintain the balance between the signaling overhead and the communication reliability.

Figure 6:
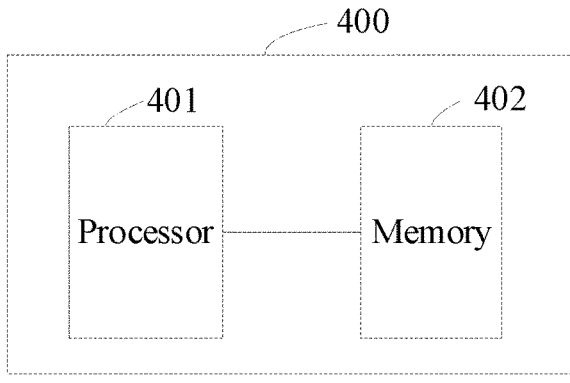
FIG. 6 is a structural diagram of a mobile terminal provided by an embodiment of the present application.

In addition, the embodiment of the present application also provides a mobile terminal, which may be devices such as a smart phone, a tablet computer, etc. As shown in FIG. 6, the mobile terminal 400 includes a processor 401 and a memory 402. The processor 401 is electrically connected with the memory 402.

The processor 401 is a control center of the mobile terminal 400, and it uses various interfaces and lines to connect various parts of a whole mobile terminal, and executes various functions and processes data of the mobile terminal by running or loading an application stored in the memory 402 and invoking data stored in the memory 402, so as to monitor the mobile terminal as a whole.

In the present embodiment, the processor 401 in the mobile terminal 400 will load instructions corresponding to a process of one or more applications into the memory 402 according to following steps, and the processor 401 will run the applications stored in the memory 402 to realize the various functions:

in a process of triggering a blind retransmission mechanism, obtaining retransmission times circularly; and when the retransmission times are less than a preset retransmission time threshold, retransmitting the data to the receiving terminal and updating the retransmission times.

Figure 7:
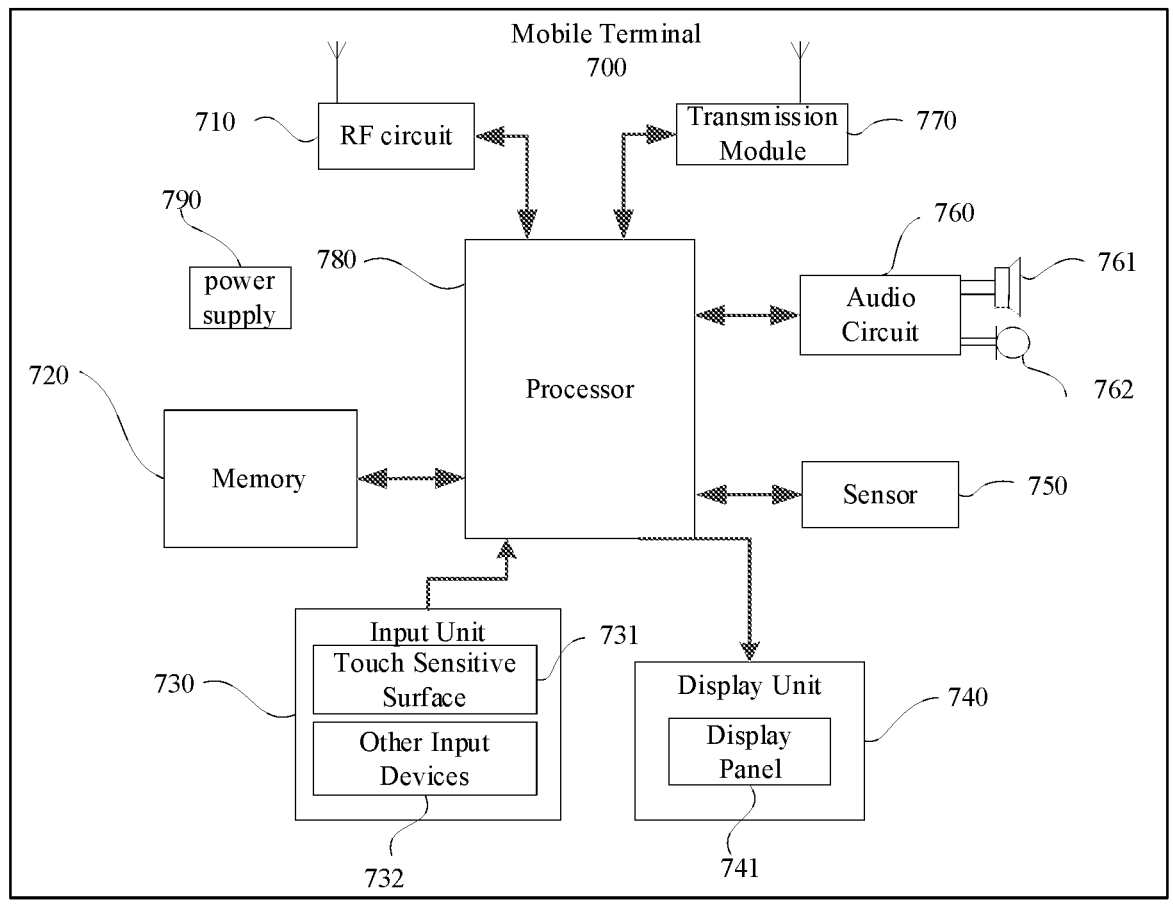
FIG. 7 is another structural diagram of the mobile terminal provided by an embodiment of the present application.

Please refer to FIG. 7, FIG. 7 is a structural diagram of the mobile terminal provided by an embodiment of the present application. The mobile terminal may be used to implement the data transmission method provided in the above embodiment. The mobile terminal may connect to a network.

A radio frequency (RF) circuit 710 is used to receive and transmit electromagnetic waves and to realize mutual conversion of the electromagnetic waves and electrical signals, and thus communicate with a communication network or other devices. The RF circuit 710 may include various existing circuit elements for performing these functions, such as antennas, RF transceivers, digital signal processors, encryption/decryption chips, subscriber identity module (SIM) cards, memories, or the like. The RF circuit 710 may communicate with various networks such as the Internet, an intranet, and a wireless network, or communicate with other devices through a wireless network. The above wireless network may include a cellular telephone network, a wireless local area network, or a metropolitan area network. The above wireless networks may use various communication standards, protocols, and technologies, including but not limited to Global System for Mobile Communication (GSM), Enhanced Data GSM Environment (EDGE), wideband code-division multiple access (WCDMA), code-division multiple access (CDMA), time-division multiple access (TDMA), Wireless Fidelity (WI-FI) (such as Institute of Electrical and Electronics Engineers Standards IEEE 802.11a, IEEE 802.11b, IEEE802.11g, and/or IEEE 802.11n), Voice over Internet Protocol (VoIP), Worldwide Interoperability for Microwave Access (Wi-MAX), other protocols for E-mails, instant messaging, and Short Message Service (SMS), as well as any other appropriate communication protocols, and may even include those protocols that have not yet been developed.

A memory 720 may be used to store software programs and modules, such as the corresponding program instructions/modules in the above embodiments. The processor 780 executes various functional applications and data processing by running the software programs and modules stored in the memory 720. The memory 720 may include a high-speed random access memory and may also include a nonvolatile memory, such as one or more magnetic storage devices, flash memories, or other nonvolatile solid-state memories. In some instances, the memory 720 may further include a memory remotely set relative to the processor 780, which may be connected to the mobile terminal 700 via the network. Examples of the above network include, but are not limited to, the Internet, the intranet, the local area network, a mobile communication network, or a combination thereof.

An input unit 730 may be used to receive input digital or character information inputted and generate signal inputs of a keyboard, a mouse, a joystick, an optical device, or a trackball related to user settings and functional controls. Specifically, the input unit 730 may include a touch-sensitive surface 731 and other input devices 732. The touch-sensitive surface 731, also known as a touch display screen (a touch screen) or a trackpad, may collect a user's touch operation (such as the user's operation on or near the touch-sensitive surface 731 with any suitable object or accessory such as fingers and styluses) on or near it, and drive a corresponding connection device according to a preset program. Alternatively, the touch-sensitive surface 731 may include two parts: a touch detection device and a touch controller. The touch detection device detects a user's touch orientation, detects a signal generated by the touch operation, and transmits the signal to the touch controller. The touch controller receives touch information from the touch detection device, converts it into contact coordinates, and sends the contact coordinates to the processor 780, and may receive and execute a command sent by the processor 780.

In addition, the touch-sensitive surface 731 may be realized by many types, such as resistance types, capacitance types, infrared rays, and surface acoustic waves. In addition to the touch-sensitive surface 731, the input unit 730 may further include other input devices 732. Specifically, the other input devices 732 may include, but are not limited to, one or more of a physical keyboard, a function key (such as a volume control key, a switch key, etc.), a trackball, a mouse, a joystick, etc.

A display unit 740 may be used to display information input by the user or provided to the user and various graphical user interfaces of the mobile terminal 700, which may be composed of graphics, texts, icons, videos, and any combination thereof. The display unit 740 may include a display panel 741. Optionally, the display panel 741 may be configured in the form of a liquid crystal display (LCD), an organic light-emitting diode (OLED), etc. Further, the touch-sensitive surface 731 may cover the display panel 741. When detecting the touch operation on or near it, the touch-sensitive surface 731 transmits the touch operation to the processor 780 to determine a type of a touch event. Then the processor 780 provides a corresponding visual output on the display panel 741 according to the type of the touch event. Although in the figure, the touch-sensitive surface 731 and the display panel 741 are used as two independent components to realize the input and output functions, it is understandable that the touch-sensitive surface 731 and the display panel 741 are integrated to realize the input and output functions.

The mobile terminal 700 may also include at least one sensor 750, such as an optical sensor, a motion sensor, and other sensors. Specifically, the optical sensor may include an ambient light sensor and a proximity sensor. The ambient light sensor may adjust the brightness of the display panel 741 according to the brightness or darkness of the ambient light. The proximity sensor may be interrupted when a flip is closed or turned off. As a kind of the motion sensor, a gravity acceleration sensor may detect a magnitude of acceleration in all directions (generally three axes), and may detect a magnitude and a direction of gravity when it is stationary. The gravity acceleration sensor may be used to identify an application of a mobile phone posture (such as horizontal and vertical screen switching, related games, magnetometer posture calibration), a vibration recognition related function (such as a pedometer and tapping), etc. A gyroscope, a barometer, a hygrometer, a thermometer, an infrared sensor, and other sensors that the mobile terminal 700 may also be configured with will not elaborated here.

An audio circuit 760, a speaker 761, and a microphone 762 may provide an audio interface between the user and the mobile terminal 700. The audio circuit 760 may transmit an electrical signal, which is converted from received audio data, to the speaker 761, and the speaker 761 converts the electrical signal into a sound signal for output. On another hand. The microphone 762 converts a collected sound signal into an electrical signal, and the audio circuit 760 receives and converts the electrical signal into audio data. Then, the audio data is output to the processor 780 to be processed and sent to, for example, another terminal through the RF circuit 710, or is output to the memory 720 for further processing. The audio circuit 760 may also include an earplug jack to provide communication between a peripheral headset and the mobile terminal 700.

The mobile terminal 700 may help the user receive a request, send information, etc., through a transmission module 770 (such as a WI-FI module), which provides the user with wireless broadband Internet access. Although the transmission module 770 is shown in the figure, it may be understood that it does not belong to necessary composition of the mobile terminal 700 and may be omitted as needed without changing the scope of the essence of the invention.

The processor 780 is a control center of the mobile terminal 700, and it uses various interfaces and lines to connect various parts of a whole mobile phone, executes various functions and processes data of the mobile terminal 700 by running or executing software and/or modules stored in the memory 720 and invoking the data stored in the memory 720, so as to monitor the mobile terminal as a whole. Optionally, the processor 780 may include one or more processing cores. In some embodiments, the processor 780 may integrate an application processor and a modem processor, wherein the application processor mainly processes an operating system, a user interface, an application program, etc., and the modem processor mainly processes wireless communication. Understandably, the above modem processor may not be integrated into the processor 780.

The mobile terminal 700 also includes a power supply 790 (such as a battery) that supplies power to various components. In some embodiments, the power supply may be logically connected with the processor 780 through a power management system, so as to realize functions of charging, discharging, and power consumption management through the power management system. The power supply 790 may also include one or more DC or AC power supplies, a recharging system, a power failure detection circuit, a power converter or inverter, a power status indicator, and any other components.

Although not shown, the mobile terminal 700 also includes a camera (such as a front camera, a rear camera), a BLUETOOTH module, etc., which will not be elaborated here. Specifically, in the present embodiment, the display unit of the mobile terminal is a touch screen display, and the mobile terminal also includes a memory and one or more programs. The one or more programs are stored in the memory and configured to be executed by one or more processors. The one or more programs contain instructions for performing following operations:

in a process of triggering a blind retransmission mechanism, obtaining retransmission times circularly; and when the retransmission times are less than a preset retransmission time threshold, retransmitting data to a receiving terminal and updating the retransmission times.

During specific implementation, the above modules may be implemented as independent entities, or may be combined arbitrarily to be implemented as one entity or several entities. For the specific implementation of the above modules, please refer to the above method embodiments, which will not be repeated here.

Those skilled in the art may understand that all or part of the steps in the various methods of the above embodiments may be completed by instructions, or by instructions controlling related hardware. The instructions may be stored in a computer-readable storage medium, and loaded and executed by a processor. To this end, the embodiment of the present invention provides a storage medium storing a plurality of instructions. The instructions may be loaded by the processor to perform the steps in any data transmission method provided by the embodiment of the invention.

The storage medium may include a read only memory (ROM), a random access memory (RAM), a magnetic disk, an optical disk, etc.

Since the instructions stored in the storage medium may perform the steps in any data transmission method provided by the embodiment of the present invention, the beneficial effects that may be achieved by any data transmission method provided by the embodiment of the present invention may be realized. Detailed descriptions can be seen in the previous embodiment and will not be repeated here.

The specific implementation of the above operations can be seen in the previous embodiments and will not be repeated here.

To sum up, although the present application has been disclosed as above with preferred embodiments, the above preferred embodiments are not intended to limit the present application. Those skilled in the art may make various changes and refinements without departing from the spirit and scope of the present application. Therefore, the protection scope of the present application is subject to the scope defined in the claims.

What is claimed is:

1. A data transmission method applied to a mobile terminal, comprising:

in a process of triggering a blind retransmission mechanism, obtaining retransmission times circularly; and when the retransmission times are less than a preset retransmission time threshold, retransmitting data to a receiving terminal and updating the retransmission times, so as to limit the retransmission times of the data through updating the retransmission times;

wherein a retransmission is triggered when the retransmission times are less than the preset retransmission time threshold;

wherein the mobile terminal sets a counter having an initial value of 0 for calculating blind retransmission times, and the counter is increased by 1 each time the mobile terminal performs a blind retransmission, such that the mobile terminal stops retransmitting when the counter reaches the preset retransmission time threshold; and wherein the mobile terminal obtains current retransmission times when triggering the blind retransmission mechanism, calculates remaining retransmission times according to the current retransmission times and the preset retransmission time threshold, and performs retransmissions according to the remaining retransmission times;

wherein the retransmission times include the blind retransmission times and Hybrid Automatic Repeat Request (HARQ) retransmission times, and the retransmission time threshold includes a blind retransmission time threshold and an HARQ retransmission time threshold; and when the retransmission times are less than the preset retransmission time threshold, retransmitting the data to the receiving terminal and updating the retransmission times comprises:

when the blind retransmission times are less than the blind retransmission time threshold, and a sum of the blind retransmission times and the HARQ retransmission times is less than the HARQ retransmission time threshold, retransmitting the data to the receiving terminal and updating the blind retransmission times.

2. The data transmission method as claimed in claim 1, wherein the method further comprises:

detecting a communication distance between the mobile terminal and the receiving terminal in real time; and when it is detected that the communication distance is greater than a preset communication distance threshold, triggering the blind retransmission mechanism.

3. The data transmission method as claimed in claim 1, wherein the method further comprises:

when the blind retransmission times are not less than the blind retransmission time threshold, or the sum of the blind retransmission times and the HARQ retransmission times is not less than the HARQ retransmission time threshold, stopping the retransmitting of the data to the receiving terminal.

4. The data transmission method as claimed in claim 1, wherein an initial value of the blind retransmission times is 0; and updating the blind retransmission times comprises:

increasing the blind retransmission times by 1.

5. The data transmission method as claimed in claim 1, wherein the retransmission times include blind retransmission times, and the retransmission time threshold includes a blind retransmission time threshold; and when the retransmission times are less than the preset retransmission time threshold, retransmitting the data to the receiving terminal and updating the retransmission times comprises:

when the blind retransmission times are less than the blind retransmission time threshold, retransmitting the data to the receiving terminal and updating the blind retransmission times.

6. The data transmission method as claimed in claim 5, wherein the method further comprises:

when the blind retransmission times are not less than the blind retransmission time threshold, stopping the retransmitting of the data to the receiving terminal.

7. The data transmission method as claimed in claim 5, wherein an initial value of the blind retransmission times is 0; and updating the blind retransmission times comprises:

increasing the blind retransmission times by 1.

8. The data transmission method as claimed in claim 1, wherein if the remaining retransmission times are determined as greater than one, the mobile terminal performs the retransmissions sequentially with the same data for each retransmission.

9. A non-transitory computer-readable storage medium storing a plurality of instructions, and the instructions are suitable to be loaded by a processor to perform following operations:

in a process of triggering a blind retransmission mechanism, obtaining retransmission times circularly; and when the retransmission times are less than a preset retransmission time threshold, retransmitting data to a receiving terminal and updating the retransmission times, so as to limit the retransmission times of the data through updating the retransmission times;

wherein a retransmission is triggered when the retransmission times are less than the preset retransmission time threshold;

wherein the instructions further cause the processor to set a counter having an initial value of 0 for calculating blind retransmission times, and to increase the counter by 1 each time the mobile terminal performs a blind retransmission, such that retransmitting is stopped when the counter reaches the preset retransmission time threshold; and wherein the instructions further cause the processor to obtain current retransmission times when triggering the blind retransmission mechanism, calculate remaining retransmission times according to the current retransmission times and the preset retransmission time threshold, and perform retransmissions according to the remaining retransmission times;

wherein the retransmission times include the blind retransmission times and Hybrid Automatic Repeat Request (HARQ) retransmission times, and the retransmission time threshold includes a blind retransmission time threshold and an HARQ retransmission time threshold; and when the retransmission times are less than the preset retransmission time threshold, retransmitting the data to the receiving terminal and updating the retransmission times comprises:

when the blind retransmission times are less than the blind retransmission time threshold, and a sum of the blind retransmission times and the HARQ retransmission times is less than the HARQ retransmission time threshold, retransmitting the data to the receiving terminal and updating the blind retransmission times.

10. The non-transitory computer-readable storage medium as claimed in claim 9, wherein the instructions are suitable to be loaded by the processor to further perform following operations:

detecting a communication distance between a mobile terminal and the receiving terminal in real time; and when it is detected that the communication distance is greater than a preset communication distance threshold, triggering the blind retransmission mechanism.

11. The non-transitory computer-readable storage medium as claimed in claim 9, wherein the instructions are suitable to be loaded by the processor to further perform following operations:

when the blind retransmission times are not less than the blind retransmission time threshold, or the sum of the blind retransmission times and the HARQ retransmission times is not less than the HARQ retransmission time threshold, stopping the retransmitting of the data to the receiving terminal.

12. The non-transitory computer-readable storage medium as claimed in claim 9, wherein an initial value of the blind retransmission times is 0; and updating the blind retransmission times comprises:

increasing the blind retransmission times by 1.

13. A mobile terminal, comprising:

a memory storing one or more programs; and a processor connected with the memory and configured to perform following operations by running the one or more programs stored in the memory:

in a process of triggering a blind retransmission mechanism, obtaining retransmission times circularly; and when the retransmission times are less than a preset retransmission time threshold, retransmitting data to a receiving terminal and updating the retransmission times, so as to limit the retransmission times of the data through updating the retransmission times;

wherein a retransmission is triggered when the retransmission times are less than the preset retransmission time threshold;

wherein the processor is further configured to set a counter having an initial value of 0 for calculating blind retransmission times, and to increase the counter by 1 each time the mobile terminal performs a blind retransmission, such that retransmitting is stopped when the counter reaches the preset retransmission time threshold; and wherein the processor is further configured to obtain current retransmission times when triggering the blind retransmission mechanism, calculate remaining retransmission times according to the current retransmission times and the preset retransmission time threshold, and perform retransmissions according to the remaining retransmission times;

wherein the retransmission times include the blind retransmission times and Hybrid Automatic Repeat Request (HARQ) retransmission times, and the retransmission time threshold includes a blind retransmission time threshold and a HARQ retransmission time threshold; and when the retransmission times are less than the preset retransmission time threshold, retransmitting the data to the receiving terminal and updating the retransmission times comprises:

when the blind retransmission times are less than the blind retransmission time threshold, and a sum of the blind retransmission times and the HARQ retransmission times is less than the HARQ retransmission time threshold, retransmitting the data to the receiving terminal and updating the blind retransmission times.

14. The mobile terminal as claimed in claim 13, wherein the processor is further configured to perform following operations by running the one or more programs stored in the memory:

detecting a communication distance between the mobile terminal and the receiving terminal in real time; and when it is detected that the communication distance is greater than a preset communication distance threshold, triggering the blind retransmission mechanism.

15. The mobile terminal as claimed in claim 13, wherein the processor is further configured to perform following operations by running the one or more programs stored in the memory:

when the blind retransmission times are not less than the blind retransmission time threshold, or the sum of the blind retransmission times and the HARQ retransmission times is not less than the HARQ retransmission time threshold, stopping the retransmitting of the data to the receiving terminal.

16. The mobile terminal as claimed in claim 13, wherein an initial value of the blind retransmission times is 0; and updating the blind retransmission times comprises:

increasing the blind retransmission times by 1.

* * * * *